Figure 1:
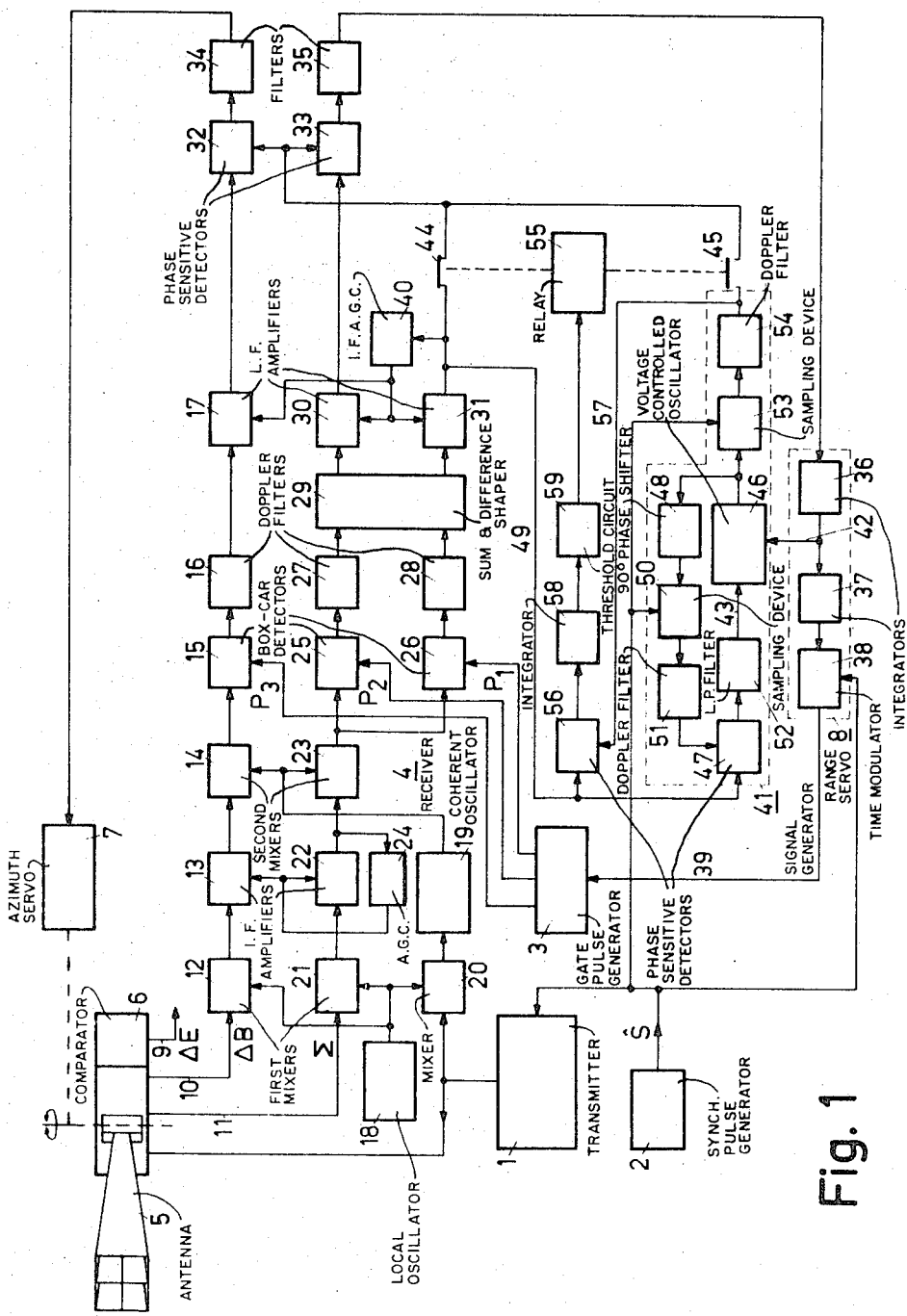

United States Patent [19]
Gellekink

[11] 3,728,723
[45] Apr. 17, 1973

[54] MONOPULSE RADAR APPARATUS
[75] Inventor: Bernard Gellekink, Hengelo (O), Netherlands
[73] Assignee: N.V. Hollandse Signaalapparaten, Hengelo (O), Netherlands
[22] Filed: July 30, 1970
[21] Appl. No.: 59,417

[30] Foreign Application Priority Data
Aug. 12, 1969 Netherlands..........................6912229

[52] U.S. Cl.................................343/7.4, 343/16 M
[51] Int. Cl.................................................G01s 9/02
[58] Field of Search........................343/7.4, 7.7, 16 M

[56] References Cited

UNITED STATES PATENTS

| | | | |
|---|---|---|---|
| 3,550,126 | 12/1970 | Van Hijfte et al. | 343/16 M |
| 2,776,426 | 1/1957 | Altman | 343/16 M |
| 3,239,836 | 3/1966 | Chubb et al. | 343/7.4 |
| 3,467,963 | 9/1969 | Van Popta | 343/16 M |
| 3,560,974 | 2/1971 | Lecourtier et al. | 343/16 M |

*Primary Examiner*—Malcolm F. Hubler
*Attorney*—Frank R. Trifari

[57] ABSTRACT

A monopulse radar apparatus for the automatic tracking of a moving target comprising a receiver for the coherent detection and filtering of received echo signals without undesired noise signals and undesired signals that are caused by signal and noise components falling within the passband of the filter due to the internal clutter movement of fixed targets. The receiver comprises a signal generator that provides only desired narrow-band signals to track the target when the frequency and phase of the signal generator matches that of the detected doppler signal, thereby resulting in optimum subclutter tracking.

5 Claims, 3 Drawing Figures

INVENTOR
BERNARD GELLEKINK

MONOPULSE RADAR APPARATUS

The invention relates to a monopulse radar apparatus for automatically tracking a moving target, provided with a transmitter for transmitting pulses of high frequency electromagnetic energy, a receiver equipped for the coherent detection and filtering of echo signals received to generate at least a first and a second output signal whereby each of these output signals is composed of a desired sampled and coarse-filtered doppler signal, an undesired noise signal, caused by frequency instabilities (jitter), which are inherent to the system, and an undesired noise signal caused by the components falling within the passband of the filter and occurring as a consequence of the internal clutter movement of fixed targets and which radar apparatus is further provided with at least an error detector to which said output signal and a reference signal are fed to generate an error signal for an associated tracking circuit.

Such a radar apparatus is known and is capable of tracking the target also when the target echoes are received simultaneously with relatively strong clutter echoes. This type of radar apparatus applying a coarse doppler filter in the coherent detection chains for generating said first and second output signal, is highly advantageous, in contrast with the monopulse tracking radars operating with a narrow band doppler filter, in that said output signals are produced irrespective of the radial speed of the target to be tracked, because the desired doppler signal is practically always within the relative broad passband of the filter. This is particularly important during the picking-up phase, because the radial target speed and thus the doppler signal frequency are still unknown then. An additional important advantage is that the relatively broad passband of the coarse filters applied simply allows the changing, for instance at random, of the transmitter pulse repetition frequency to avoid blind speeds.

However, the application of doppler filters with relatively broad passband is disadvantageous in that the capability of the radar to track a target of which the echoes received are weaker than the clutter echoes locally received (sub-clutter trackability) is unfavorably influenced by the fact that the doppler filters do not only pass the desired doppler signal, but also the above-mentioned undesired noise signals.

It is the object of the invention to improve a monopulse radar apparatus using a relatively coarse filter in the coherent detection chains, in such a way, that the sub-clutter trackability is considerably higher, thereby retaining the inherent advantages.

In accordance with the invention, the receiver of a monopulse radar apparatus of the type described above is provided for this purpose with a signal generator and control chains for so controlling said signal generator that it supplies a third output signal which is equal in frequency and phase to the desired, sampled and coarse-filtered doppler signal and also with switching means for feeding to said error detector, as a reference signal, at option:

either the second output signal, whereby said error signal is generated without suppression of said noise signals, or the third output signal whereby said error signal is generated, while said noise signals are both suppressed.

Figure 2:
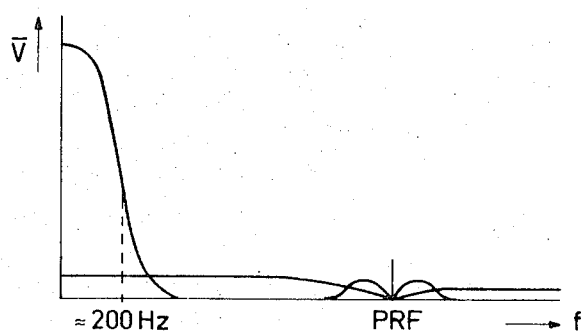
Figure 3:
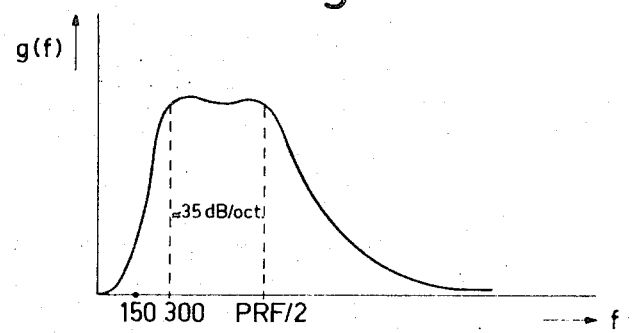

The invention and its advantages are further explained by means of the figures, of which:

FIG. 1 shows in block diagram form a possible embodiment of the monopulse radar apparatus in accordance with the invention, while FIGS. 2 and 3 show a number of diagrams to explain the radar apparatus according to FIG. 1.

FIG. 1 shows the block diagram of a monopulse radar apparatus of the type based on the so-called sum and difference method and used to track a moving target in two angular coordinates and in range, notwithstanding the simultaneous reception of relatively strong clutter signals. In view of this the radar apparatus shown comprises a transmitter 1, a synchronization pulse generator 2, a gate pulse generator 3 and a receiver 4. The electromagnetic energy generated in the transmitter is transmitted via the antenna system denoted by 5 in the pulse rhythm of the synchronization pulses supplied by generator 2. As is customary with a monopulse radar apparatus based on the sum and difference method, the energy received in the four sections of the feed horn in the antenna system as a consequence of a target echo is converted by means of a comparator 6 into an elevation difference signal $\Delta E$, an azimuth difference signal $\Delta B$, and a sum signal $\Sigma$. The above signals contain amplitude and phase information which is a measure for the magnitude and direction of the target deviation with respect to the radar symmetry axis. Thus, these signals can be used for the generation of the error signals required for the control of azimuth servo 7, an elevation servo (not shown) and a range servo 8, respectively, by means of which the target is tracked in azimuth, elevation and range. For this purpose, the above signals $\Delta B$, $\Delta E$ and $\Sigma$ are fed via waveguides 9, 10 and 11 to the receiver 4, in which they are processed in separate channels. For simplicity's sake, the receiver channel processing the $\Delta E$-signal is not shown in FIG. 1, because this channel corresponds entirely to the $\Delta B$-channel that will now be described.

This channel comprises successively a first mixer 12, an intermediate frequency amplifier 13, a second mixer 14, a boxcar circuit 15, a doppler filter 16 and a low frequency amplifier 17. In mixer 12 the high frequency $\Delta B$-signal is converted into an intermediate frequency signal by mixing it with the output signal of local oscillator 18. After having been amplified in intermediate frequency amplifier 13, this intermediate frequency signal $\Delta B_{IF}$ is mixed in the second mixer with the output signal of a coherent oscillator (coho) 19. The signal frequency after the second mixer is equal to the doppler frequency, but sampled by the transmitter pulses.

Since transmitter 1 consists of an oscillator (magnetron) which only operates during the pulse duration, the phase of the signal coming from it is practically distributed at random with respect to the output signal of local oscillator 18. In order to offset this, both signals are supplied to a mixer 20. The output signal of this mixer is subsequently supplied to oscillator 19 in such a way that this oscillator is forced to assume the same phase. The signal supplied by coho 19 is then a replica of the transmitter frequency, however, transformed to the intermediate frequency. In this way the echo of an ideal fixed target at intermediate frequency level is made to have always the same phase relation with respect to the coho signal, so that a pulse with constant amplitude is obtained after the last mixing in mixer 14. For a moving target, the above-mentioned phase relation varies and thus the amplitude with the doppler frequency shift.

The circuit following mixer 14, the so-called boxcar, has two functions. First, a range selection takes place in this circuit, that is to say only those echo pulses which fall within a range gate $P_3$ determined by gate pulse generator 3 are passed. In fact new sampling takes place again. Second, there is such a pulse stretching that the output signal of the boxcar is constituted by the envelope signal of the selected pulses. This envelope signal is fed via doppler filter 16 to a low frequency amplifier 17, which supplies an output signal whose amplitude is a measure for the angular error in azimuth.

The receiver channel processing sum signal $\Sigma$ comprises also a first mixer 21, an intermediate frequency amplifier 22 and a second mixer 23. The high frequency sum signal is processed in the same way as described above for the $\Delta B$-signal by means of these mixers, so that after the last mixing in mixer 23, a pulse with constant amplitude is also obtained for echoes of fixed targets while this amplitude for echoes of a moving target varies proportionally with the doppler frequency shift.

In order to eliminate fluctuations occurring as a consequence of changes of the target range and/or the total reflecting target surface, the intermediate frequency difference signals are normalized with respect to the intermediate frequency sum signal by means of an AGC-circuit 24, connected to the output of intermediate frequency amplifier 22.

The receiver sum channel differs from the difference channel in that the output signal of the second mixer 23 is fed to two boxcar circuits 25 and 26 which are each supplied with a different range selection gate $P_1$ and $P_2$ respectively, whereby the trailing edge of range selection gate $P_1$ coincides with the leading edge of range selection gate $P_2$. If the moment of occurrence of the common leading and trailing edge of said range selection gates coincides with the axis of symmetry of the sum video, the two boxcar circuits 25 and 26 supply an equal output signal. In the other case a difference arises. The output signals of the two boxcar circuits 25 and 26 are each supplied via doppler filters 27 and 28, respectively, to a sum and difference shaper 29, of which the difference output and the sum output are each connected to a low frequency amplifier 30 and 32, respectively. The amplitude of the output signal of low frequency amplifier 30 is a measure for the range error.

Each of the output signals of low frequency amplifier 17 and 30, respectively, is a first output signal of the receiver, while the sum signal occurring at the output of low frequency amplifier 31 is a second output signal of the receiver. In spite of the fact that an automatic gain control is applied at i.f.-level having as starting point the absolute value of the $\Sigma$-signal at the input of the second mixer 14, the low frequency $\Sigma$-signal is not constant. An attenuation occurs when the echo of the target tracked coincides with the relatively strong echo of a fixed target, because the i.f. AGC keeps the sum constant. In order to offset this, the amplification in the l.f.-amplifiers is determined by an AGC-circuit 40 (l.f. AGC) which keeps the output signal of the $\Sigma$-amplifier 31 constant on the basis of the average value. The remaining l.f.-amplifiers 17 and 30 are passively controlled.

Since each of the two first output signals of the receiver consists of an a.c. voltage, they are compared with a reference signal in a fault detector consisting of phase sensitive detector 32 and 33, respectively, to determine the sign of the angular error or range error, respectively, indicated by these signals. The nature of this reference signal will be further described below. The output signal of detector 32 is then fed to said azimuth servo 7 via a filter 34 for the additional control in azimuth of antenna 5. The output signal of detector 33 is fed via filter 35 to said range servo 8. This servo consists of the integrators 36 and 37, respectively and the time modulator 38, which form a cascade circuit. The latter is started by a synchronization pulse S of sync pulse generator 2 and then supplies an output pulse after the synchronization pulse at a time varying with the output voltage of integrator 37. Via lead 39 these pulses are fed to gate pulse generator 3 to determine the moment of occurrence of the range selection gates generated by this generator.

In the ideal case an ideal fixed target falling within the range gate would give a d.c. voltage after each boxcar circuit. In practice, however, this is not the case because on the one hand ideal fixed targets do not exist because of the internal clutter movement and on the other hand an ideal transmitter receiver cannot be realized (system jitter). Other errors are: the phase-lock errors of the coho; instabilities of the two oscillators and frequency modulation of the transmitter during the transmitter pulse. In general, therefore, a fixed target causes noise. An impression of the associated spectrum after the boxcar circuits is shown in FIG. 2. Measurements have shown that components which occur as a consequence of the internal clutter movement are present up to the order of 300 Hz, while the system jitter results in a more or less even spectrum with some small peaks coming from the supply voltage frequency, ventilators, etc. In addition an extra peak occurs with the pulse repetition frequency caused by the not ideal operation of the boxcar circuits. The doppler filters included in the chains after the boxcar circuits now serve to enable a distinction fixed target - moving target. The passband of each of the doppler filters, however, is relatively large. This relatively large passband is required, because rather large variations in doppler signal frequency may occur on the one hand as a consequence of a change in radial velocity of the target track and on the other hand because the transmitter pulse repetition frequency, to avoid blind speeds, may be changed at random. To illustrate this point FIG. 3 shows the pass characteristic of the doppler filter, which shows that the passband rapidly drops below for instance 300 Hz and above half the pulse repetition frequency. As a consequence of this relatively broad passband the filter passes not only the doppler frequency, but also the frequency components occurring as a consequence of the system jitter and at least part of the frequency components which occur as a consequence of the internal clutter movement. Each output signal of the receiver is, therefore, composed of a desired, sampled and coarse filtered doppler signal, an undesired noise signal, caused by frequency instabilities (system jitter) and an undesired noise signal caused by the components falling within the passband of the filter, which occur as a consequence of the internal clutter movement of fixed targets. This causes the sub-clutter trackability of the system to be adversely influenced, because, depending on the signal/clutter ratio and the bandwidth of the various tracking loops, noise is introduced into these loops, but in addition a systematic error, depending on the position of the fixed target with respect to the tracked moving target.

In accordance with the invention a particularly favorable and in every respect advantageous radar apparatus is now obtained if receiver 4 is provided with a signal generator 41 and control chains 42 and 43 for controlling said signal generator in such a way that it supplies a third output signal which is equal in frequency and phase to the desired sampled and coarse filtered doppler signal, and is also provided with switching means 44 and 45 for supplying to said error detector 32 or 33, respectively, at random as a reference signal either the second output signal whereby said error signal is generated without suppressing said noise signals — or the third output signal, whereby said error signal is generated, while said noise signals are both suppressed.

In the embodiment represented said signal generator 41 comprises a voltage-controlled oscillator 46, to which a frequency control signal is supplied via control chain 42 and a phase control signal via control chain 43. The frequency control signal can be automatically generated by means of a device which derives, from the signals received, information regarding the radial speed of the target tracked and which device also supplies a d.c. control voltage varying with said radial speed. The embodiment given includes such a device in the form of the first integrator 36 of range servo 8. This integrator also called V-miller, supplies a d.c. voltage proportional to the radial target speed.

To generate the phase control signal, control chain 43 is provided with a phase sensitive detector 47 in which the output signal of oscillator 46 is compared with the second output signal of the receiver. As a phase-sensitive detector has the property that its output signal only becomes zero if there is a 90° phase difference between the signals compared, the oscillator signal is fed via a 90° phase shifter 48. Thus, the output signal of the oscillator, when it has run in, has the same phase as the second output signal of the receiver, which is fed to a first input of said phase-sensitive detector via lead 49. As explained previously, this second output signal of the receiver consists, in addition to the noise components, of a doppler signal. This doppler signal, however, is sampled and coarse filtered. In view of this the output signal of the oscillator 46, shifted 90° in phase, is also sampled and coarse filtered in the same way before it is supplied to said phase-sensitive detector 47. The output signal of the oscillator shifted 90° in phase is therefore applied to a second input of said phase-sensitive detector, via successively a device 50, which samples the signal with the transmitter synchronization pulses and a filter 51, whose passband is equal to that of the filters applied in the receiver, as for instance doppler filter 16. The phase control signal is now derived from a low pass filter 52, connected to the output of phase-sensitive detector 47.

Oscillator 46 is further provided with an output chain with successively a device 53, in which the oscillator output signal is also sampled with the transmitter synchronization pulses Ŝ and a doppler filter 54 of which the pass band is also equal to that of the doppler filters applied in the receiver. The signal occurring at the output of doppler filter 54 is the said third output signal of the receiver. When the oscillator 46 has run-in under the control of the control signals supplied to it, this third output signal corresponds accurately with the second output signal of the receiver, however, without the noise signals which form part of the second output signal.

In the embodiment shown said switching means consist of contacts 44 and 45 of a relay circuit 55, which is operated depending on the magnitude of the output signal of a phase-sensitive detector 56 in which the second output signal supplied to said phase-sensitive detector 56 via lead 49 and the third output signal supplied to it via lead 57 are compared with each other. Via an integrator 58 and a threshold circuit 59, the output signal of phase-sensitive detector 56 is applied to a relay circuit 55 whose contacts 44 and 45 are in the position drawn during the initial phase of target tracking. In the initial phase the receiver supplies only the two first output signals and the second output signal. The two first output signals are supplied to phase sensitive detectors 32 and 33, respectively, for the generation of the angle and range error signals, whereby the second output signal of the receiver is used as a reference signal. The target is tracked in bearing and range in this initial phase on the basis of the error signals generated. The sub-clutter trackability of the system, however, is not yet optimal then, for both first output signals of the receiver fed to said phase-sensitive detectors 32 and 33, respectively, and the second output signal of the receiver supplied to these detectors as a reference signal are all subject to the same noise and, therefore, also the output signals of these detectors show a certain systematic error. As soon as the target is tracked, however, the first integrator 36 of range servo 8 supplies, via control chain 42, a frequency control signal to oscillator 46. Then this oscillator starts running-in in frequency and phase to the doppler signal, as available in the second output signal of the receiver. The signal occurring thereby at the output of doppler filter 54 is compared in phase-sensitive detector 56 with the second output signal of the receiver. As long as these compared signals show a certain phase difference, an output voltage occurs at the output of the threshold voltage and contacts 44 and 45 remain in the position drawn. When the threshold voltage does not supply an output voltage anymore, the signal generator has run-in and contacts 44 and 45 are made to assume the position not drawn, whereby the third output signal of the receiver supplied by the signal generator is fed as a reference signal to phase sensitive detector 32 and 33, respectively, via contact 45. This third output signal of the receiver is free from noise and consequently, as a reference signal, has no frequency components which correspond with the noise components of the first output signals of the receiver. Consequently the output signals of phase-sensitive detectors 32 and 33 do no longer show a systematic error.

As the third output signal of the receiver is sampled and filtered in the same way as the second output signal of the receiver originally used as a reference signal, the transmitter pulse repetition frequency can be changed now to avoid blind speeds, if required even random from pulse to pulse.

What we claim is:

1. Monopulse radar apparatus for automatically tracking a moving target comprising a high-frequency pulse transmitter, means for receiving echo signals within receiving patterns relative to predetermined axes, comparator means coupled to said receiving means for converting said echo signals into a sum signal and at least one difference signal, a receiver coupled to said comparator means, said receiver comprising means for the coherent detection and filtering of the sum and difference signals to produce at least first and second low-frequency signals proportional to the Doppler shift of moving targets, said first and second Doppler-shifted signals being composed of desired, sampled and coarse filter Doppler signals, undesired noise signals caused by frequency instabilities inherent to the system, and undesired signals caused by signal and noise components falling within the passband of Doppler filters as a consequence of the internal clutter movement of fixed targets, at least one error detector coupled to received said first Doppler-shifted signals to produce error signals for tracking circuits of said radar apparatus, and a signal generator coupled to receive said second Doppler-shifted signals and produce third Doppler-shifted signals simulating desired filter Doppler signals equal in frequency and phase to the desired, sampled and coarse filter Doppler signals, said signal generator comprising control circuits for controlling the phase and frequency of said signal generator, and switching means coupled to said control means for supplying to said error detector as reference signals the third Doppler-shifted signals having said undesired signals suppressed when the frequency and phase of said signal generator is equal to the frequency and phase of said second Doppler-shifted signals.

2. Monopulse radar apparatus as claimed in claim 1, wherein said signal generator comprises a voltage controlled oscillator and said control circuit comprises a phase control circuit, said phase control circuit comprising a first phase sensitive detector, a 90° phase shifter, and a low pass filter, the output signals of the voltage controlled oscillator supplying said first phase sensitive detector via said 90° phase shifter for comparison with the second Doppler-shifted signals, the output of said first phase-sensitive detector being connected to the input of the voltage-controlled oscillator via said low pass filter.

3. Monopulse radar apparatus as claimed in claim 2, wherein said phase control circuit further comprises a device coupled between the 90° phase shifter and the phase-sensitive detector for sampling the output signal of the voltage control oscillator with pulses in time synchronism with said transmitter pulses, said device comprising a filter whose passband is equal to that of filters used in said coherent detection and filtering means.

4. Monopulse radar apparatus as claimed in claim 2, further comprising a device which derives information relating to the radial speed of the target tracked from the signals received, said device supplying a d-c control voltage varying with said radial speed as a frequency control signal to said voltage controlled oscillator, said voltage controlled oscillator having voltage/frequency characteristics responsive to the voltage/radial speed characteristics of the device producing said d-c control voltage.

5. Monopulse radar apparatus as claimed in claim 2, wherein said switching means comprises a second phase sensitive detector for comparing the second and third Doppler-shifted signals, said switching means being automatically operated simultaneously and in response to the magnitude of the second Doppler-shifted signals of said second phase sensitive detector.

* * * * *